Nov. 18, 1941.   J. C. MARIS   2,263,442
CENTERING MECHANISM FOR LOCOMOTIVE TRUCKS
Filed July 12, 1939   2 Sheets-Sheet 1

INVENTOR
JAMES C. MARIS
BY
ATTORNEY

Nov. 18, 1941.    J. C. MARIS    2,263,442
CENTERING MECHANISM FOR LOCOMOTIVE TRUCKS
Filed July 12, 1939    2 Sheets-Sheet 2
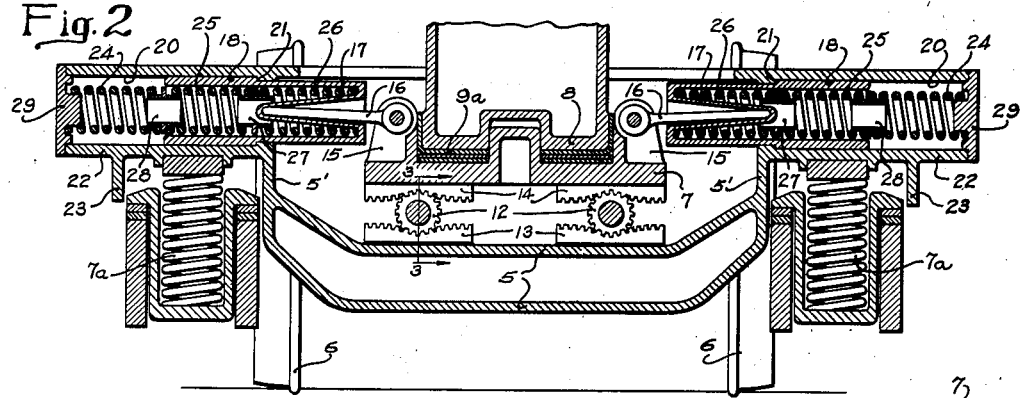
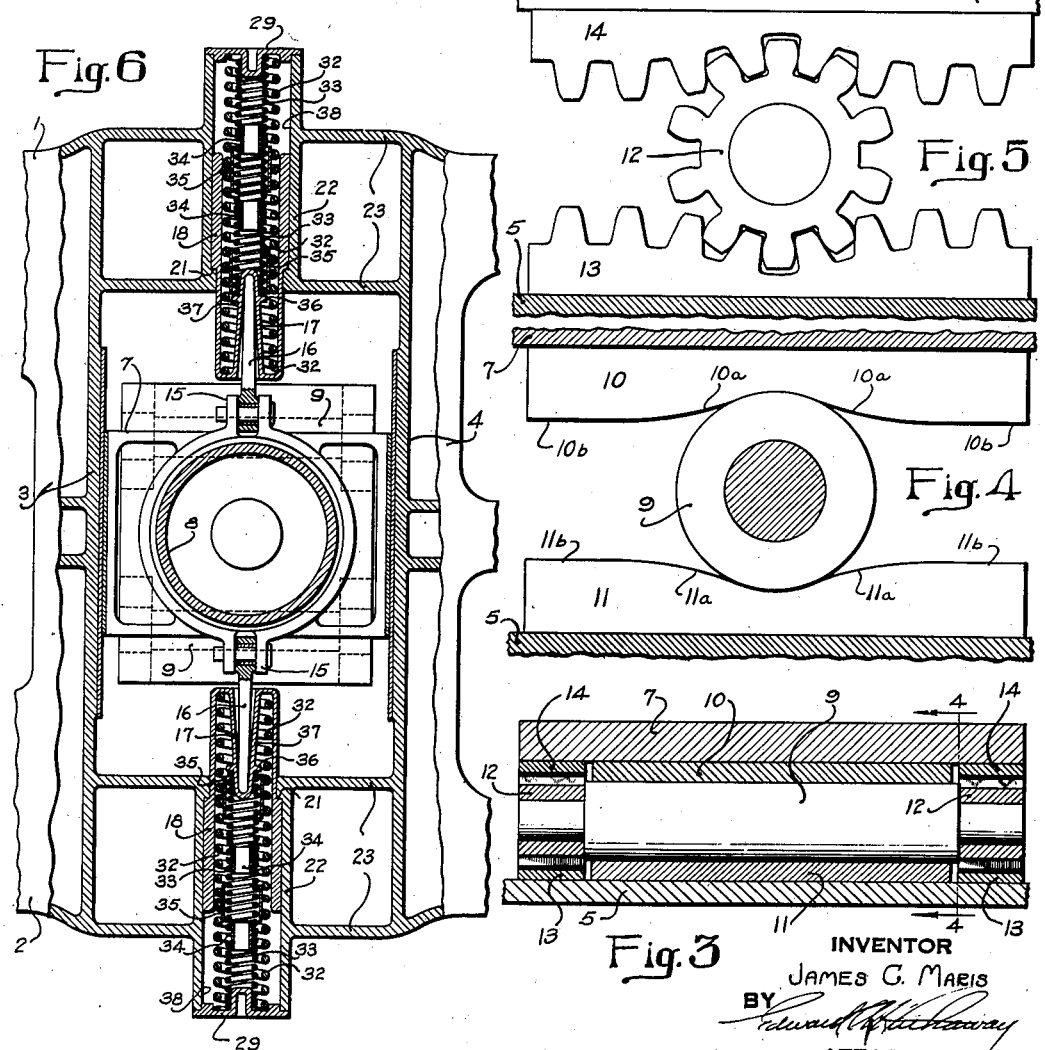
INVENTOR
JAMES C. MARIS
ATTORNEY Patented Nov. 18, 1941

2,263,442

UNITED STATES PATENT OFFICE 2,263,442

CENTERING MECHANISM FOR LOCOMOTIVE TRUCKS

James C. Maris, Glenolden, Pa.

Application July 12, 1939, Serial No. 283,956

4 Claims. (Cl. 105—189)

This invention relates generally to trucks and particularly leading trucks for locomotives.

Certain types of locomotives employ a single rigid frame of very great length thereby creating the very serious problem of adequately guiding the front end of the locomotive around curves, it being understood that the long frame causes said front end to have a wide lateral movement relative to the curved portion of the track. Hence, it is desirable to provide a laterally movable truck bolster that will allow excessive lateral movement of the locomotive frame and at the same time it is desirable to employ a centering mechanism that will effectively return the bolster. Such centering mechanisms, however, are preferably of the type as shown herein wherein the locomotive frame is bodily lifted during lateral movement of the bolster, the weight of the locomotive normally urging the centering device to return the bolster to its center position thereby insuring very stable truck operation. The difficulty with this general type of centering mechanism is that it increasingly lifts the frame during progressive lateral movement thereof. Hence, with a locomotive frame of considerable length and large lateral movement, it is seen that if progressive lifting is allowed for the full lateral movement then the frame might be excessively raised to a dangerous point. However, this large lateral movement necessitates a centering action of maximum effectiveness and one of considerable flexibility but at the same time it must have the greatest possible stability on account of the magnitude of the movement and of the large weight of the locomotive involved.

I have shown my improved arrangement specifically in connection with a four wheel type of truck inasmuch as this type offers greater adaptability to a laterally movable bolster although the invention in its broad aspects is applicable to other types of trucks.

It is an object of my invention to provide an improved combination of elements for allowing maximum relative lateral movement between the locomotive frame and truck while at the same time insuring a highly effective centering action by a lifting type centering mechanism but without excessively lifting the locomotive.

Another object is to provide an improved centering mechanism whereby a lifting type centering device is effective when the truck is near its center position but is automatically substantially ineffective when the truck and locomotive frame have a predetermined relative lateral movement.

A still further object is to provide an improved centering mechanism of the foregoing type in combination with means that will automatically produce a centering action when the mechanical centering device becomes ineffective but without causing the locomotive to be lifted any further as its frame traverses the outer lateral limits of its movement.

Another object is to provide an improved combination of a mechanical lifting type centering device and a spring type centering mechanism so functionally and structurally related to each other and to the truck structure as to insure not only maximum flexibility and stability of the truck but also to insure an arrangement that is highly compact, sturdy and readily accessible for inspection and repair as well as being relatively economical in initial cost and maintenance consistent with the wide range of centering action that is necessary.

Other objects and advantages will be more apparent to those skilled in the art from the following description of the accompanying drawings in which:

Fig. 2 is a transverse section taken on the line 2—2 of Fig. 1;

Fig. 3 is a longitudinal section of one of the centering rollers taken substantially on the lines 3—3 of Figs. 1 and 2, parts of the truck being omitted for clarity;

Fig. 4 is an end view of one of the rollers as well as the upper and lower bearing plates therefor, taken substantially on the line 4—4 of Fig. 3 but with the truck parts omitted for simplicity;

Fig. 5 is an end view of the rack and pinion arrangement at each end of the centering rollers;

Fig. 6 is a plan view, partly in section, showing a modification of my improved centering arrangement in which only one nest of springs is placed on each side of the center plate, instead of two, as shown in Fig. 1.

Figure 1:
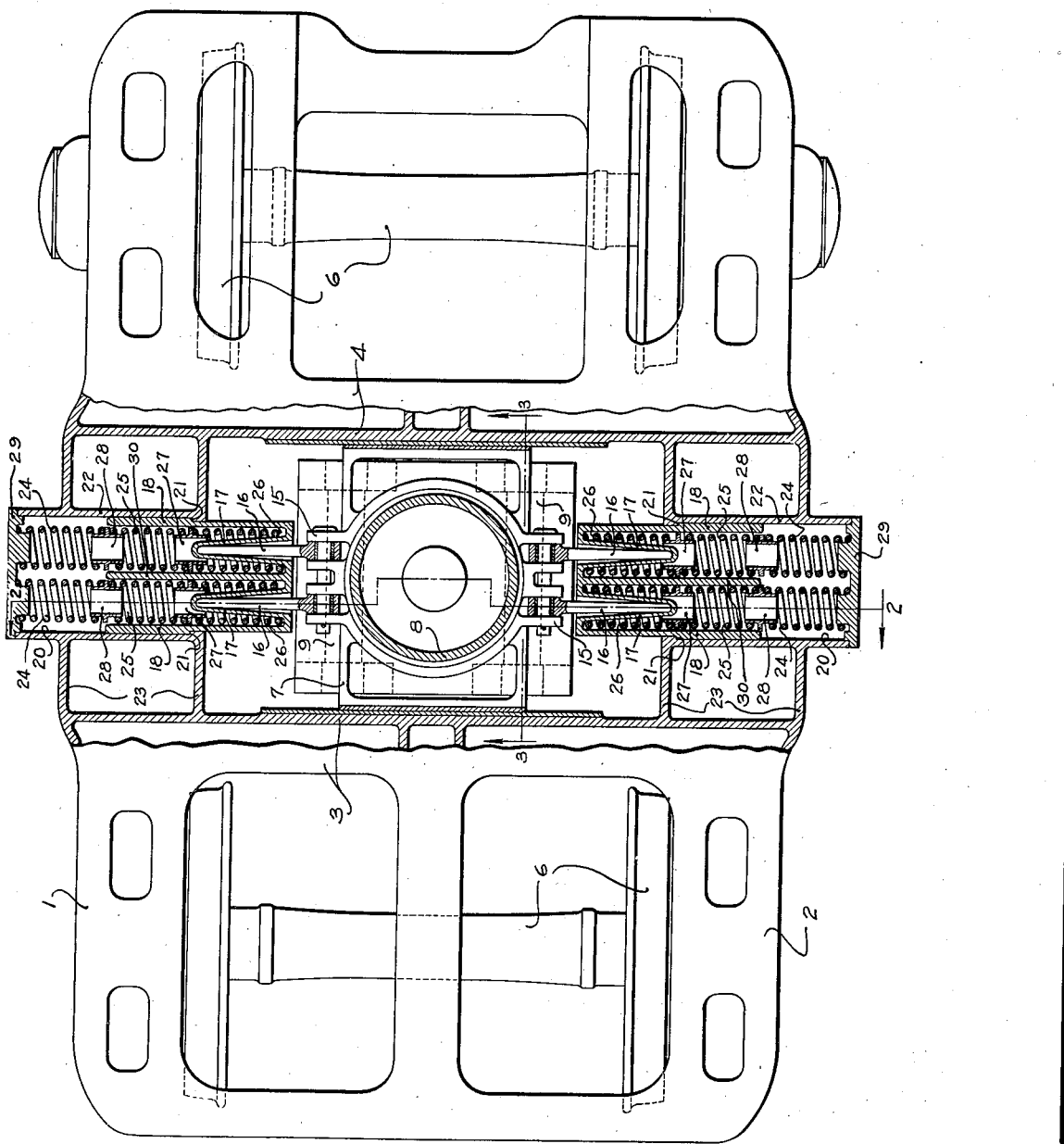
Fig. 1 is a plan view of a truck, partly in section, showing the application of my improved centering device.

In the drawings I have shown in Fig. 1 a usual form of a preferably one piece truck frame having side wheel pieces 1 and 2 connected by spaced transoms 3 and 4. A depressed middle transom section 5, Fig. 2, extends between and is connected to the lower portion of the transoms 3 and 4 and also merges at 5' with the inner walls of the side wheel pieces 1 and 2. The frame is supported on a pair of wheeled axles 6 through any usual equalizing beams and helical springs 7a, Fig. 2, all of which may be considered to be the same as shown in the patent of James C. Maris, No. 2,163,887, issued June 27, 1939. These features per se do not constitute a part of my present invention and hence further detailed description thereof is not necessary, it being understood that such features can be modified to suit the particular type of locomotive on which the truck is used.

As shown in Figs. 1 and 2 a bolster 7 is disposed between and laterally guided by the opposed transom walls 3 and 4, this bolster being of any usual type having a pocket in which the lower end of a center pin 8 is rotatably disposed. Usual shims 9a are interposed between the lower end of the center pin and bolster. The bolster is supported upon a usual type of mechanical centering device comprising a pair of transversely spaced longitudinally extending rollers 9, Figs. 1, 3 and 4, disposed between upper and lower cam or bearing members 10 and 11. Inasmuch as this centering mechanism is duplicated on each side of the longitudinal center-line of the truck, it will suffice to describe only one side thereof. The cam members 10 and 11 are suitably rigidly secured to the depressed transom member 5 and to the under surface of bolster 7. As is usual with this general type of centering device which is well-known in the art, the roller is provided at each end with pinions 12 meshing with racks 13 and 14 which are also secured to the transom 5 and bolster 7. The bearing plates or cam members 10 and 11 have curved recessed portions 10a and 11a, the roller 9 being disposed at the deepest point thereof when the bolster is completely centered. Usually these curved cam surfaces continue out along an inclined plane but in my improved arrangement the outer portions 10b and 11b are horizontal. As the truck passes around the curve and the bolster 7 moves laterally, roller 9 will move upwardly on bearing surface 11a and also surface 10a will ride upon top of the roller thereby accentuating the lifting of the locomotive. The inclined surfaces 10a and 11a will, of course, always urge the roller back to its center position except when the bolster has swung laterally to the point where the roller rests upon the horizontal surfaces 10b and 11b in which case the roller and bearing plates lose their centering action. Also, when the roller is in engagement with the horizontal surfaces 10b and 11b it is apparent that the locomotive frame will not be lifted regardless of the extent of lateral movement of the roller on these horizontal bearing portions. During lateral motion of the bolster, the pinions 12 will compel rotation of the rollers 9 and hence prevent slippage of the rollers on the bearing plates, thereby to insure uniform action of both rollers 9, 9 at all times.

The foregoing arrangement will permit a very high degree of lateral movement of the bolster without lifting the locomotive frame to an excessively dangerous elevation and at the same time I obtain an effective centering action at the outer limits of travel of the bolster. To accomplish this, I have provided a yielding centering mechanism identical on each side of the bolster and hence the description of one side will suffice for both sides. Cast in one piece with the bolster are a pair of lateral lugs 15, Figs. 1, 2 and 6, and pivoted thereto are a pair of rods 16 whose outer ends are seated within conical portions 17 which extend within a sleeve 18 from one end thereof. The sleeve 18 is laterally slidably disposed within a reasonably accurately finished bore 20 of rectangular form in cross-section, the bore having a shoulder 21 adapted to serve as a stop for engagement with a complementary stepped shoulder on sleeve 18. The bore 20 is effectively formed within a suitable wall 22 cast preferably integrally with and traversing a portion 23 of the side wheel pieces, Fig. 1, adjacent the opposed transom walls 3 and 4. The wall 22 thereby serves not only as a spring and sleeve container but also as a very effective reinforcement for the side wheel pieces and at the same time occupies available space that would otherwise not be used. Hence, this cooperative relation of walls is conducive not only to greater strength but also to maximum compactness.

Disposed within sleeve 18 are two sets of springs, each set consisting of three springs 24, 25 and 26 placed in series with each other. Between these series of springs are combined spring seats and guiding elements 27 and 28. The outer end of bore 20 is provided with a spring seat cover 29 suitably secured to the outer end of wall 22 which, as shown in Fig. 1, extends outwardly from the outer wall of the wheel pieces. The inner ends of the springs surround the conical portions 17 and are seated adjacent the bases thereof.

Disposed between the two sets of springs and formed integrally with sleeve 18 is a partition wall 30 thereby effectively separating the springs and insuring proper guidance thereof. The non-cylindrical character of sleeve 18 and bore 20 prevents rotation of the sleeve and rods 16 as well as the springs and consequently these elements are always maintained in their correct operative relationship.

In the modification shown in Fig. 6, I have shown an outer set of springs 32 and an inner coaxial set of springs 33 provided with their combined spring seat and guiding elements 34 and 35. The inner set of springs is seated upon an annular flange 36 formed on an inwardly extending conical portion 37 corresponding to the conical portions 17 of the preferred form. The advantage of this arrangement is that it is even more compact than the preferred form and, in addition, the sleeve and its bore 38 may be cylindrical thereby expediting machining of the part.

As is well understood by those skilled in the art, all of the springs described herein must be of sufficient strength to suit the size of the locomotive and the amount of lateral displacement of the bolster that is necessary when traversing curves.

*Operation.*—The manner in which the foregoing elements functionally cooperate when traversing curves is that when the truck is on a straight piece of track, the bolster and center pin 8 are in their middle position, as shown in Figs. 1 and 2 but when the truck enters a curve, the bolster and truck frame move relative to each other either to the right or left according to the direction of curvature. When this occurs the rollers move from their central position, each roller moving up the inclined surfaces of the lower bearing plates while the inclined surfaces of the upper bearing plates move up on to the rollers, thereby lifting the bolster 7 and the locomotive frame. So long as the rollers are on the cam portions 10a and 11a the weight of the locomotive tends to exert a centering action on the rollers so as to restore the bolster to its center position. However, if the curvature of the track is such as to cause considerable relative lateral movement between the bolster and truck frame, then the rollers 9 will ultimately move on to the horizontal cam surfaces 10b and 11b but this will not cause any further lifting of the locomotive and also the rollers 9 will not have any centering effect at these extreme points of lateral movement. The rollers are kept in operative relation to their bearing plates by the racks and pinion 12, 13 and 14, Fig. 5, thereby insuring uniform operation of the rollers at all times, it being noted that the racks have the same contour as the bearing plates as shown in Figs. 4 and 5. When the rollers reach the outer level or horizontal portion of the bearing plates, the front end of the locomotive has, of course, been raised through the maximum height desired and even though the rollers are now ineffective at this time, the centering springs 24, 25 and 26 have been compressed sufficiently to exert the necessary centering force on the bolster. During this particular degree of lateral movement the springs will have their maximum compressive forces but these forces will be diminished as the bolster moves towards its center position and the spring force will be at a minimum when the rollers and cam surfaces begin to effect their centering function.

When the springs on one side of the bolster are effective the springs on the other side are rendered ineffective by reason of shoulders 21 preventing one or the other of the sleeves 18 moving inwardly with the bolster beyond its center position. When one set of springs are thus rendered ineffective the rods thereof merely separate from their abutting contact with the apexes of the conical portion 17 and thereafter slide along the inclined walls thereof. The abutting relation is re-established when the bolster is again centered. A further advantage of the preferred form of my invention is that the springs, two sets on each side of the bolster, are offset on opposite sides of the transverse centerline of the bolster thereby tending to supplement the action of the transom walls in resisting any rotative effect of the bolster relative to the truck frame such as occurs through the frictional contact between the center pin and the bolster bearing therefor during pivoting of the truck. The foregoing supplemental action minimizes the excessive frictional contact between the bolster and transom walls and thereby reduces wear thereof as well as minimizing the chattering and vibration of the bolster such as may occur on account of the normal clearance between the bolster and transom walls. This improved functional relation is obtained in addition to the very important functional and structural cooperation that exists between the two centering mechanisms whereby one has its maximum effectiveness at a time when the other has minimum effectiveness, and vice versa, thereby insuring the presence of a substantially uniform centering force with its complete safety and freedom from excessive lifting of the locomotive.

It is also evident that my improved truck, as herein disclosed, provides ample maximum swing to enable a long locomotive having a rigid chassis or main frame to traverse sharp curves, and this is accomplished without raising the front end of the locomotive to an undesirable extent. It is by utilizing the cooperative resistances set up both by the lifting effect of the rollers and the compression of the controlling springs as well as the automatic discontinuance of the centering action of the rollers that I accomplish the above mentioned result.

The mode of operation of the modification shown in Fig. 6 is similar in its broad aspects to the operation of the preferred form and hence further description thereof need not be given.

It will of course be understood that various changes in details of construction and arrangement of parts may be made by those skilled in the art without departing from the spirit of the invention as set forth in the appended claims.

I claim:

1. In combination a truck having a frame and a laterally movable bolster, centering rollers and bearing plates for centering said bolster and for supporting the same on said frame, means whereby the centering action of said rollers is rendered automatically inoperative upon occurrence of a predetermined relative lateral movement between said frame and bolster, and other centering means for effecting a centering action on said bolster when the centering action of said rollers is inoperative.

2. In combination, a truck having a frame and a laterally movable bolster, centering rollers and bearing plates interposed between said bolster and frame, said bearing plates having inclined centering cam surfaces terminating in substantially non-centering horizontal surfaces, and springs laterally interposed between said bolster and frame whereby said springs are effective to exert a centering action between the bolster and truck when said rollers are in engagement with said non-centering horizontal bearing surfaces.

3. In combination, a truck having a frame and a laterally movable bolster, a lifting type centering mechanism interposed between said bolster and frame, and laterally yieldable centering means disposed on each side of said bolster and having provision whereby only one or the other of said yieldable means is adapted to exert a centering action on the bolster depending upon which way the bolster moves laterally with respect to the truck frame, said yieldable means including spring containers having inwardly extending conical portions and rods connected to said bolster and adapted to be slidably disposed within said conical portions and to have abutting engagement therewith whereby when movement of one or the other of the containers is restricted the rods on one side of said bolster may have free sliding engagement with one of the conical portions while the rods on the other side of said bolster will abut against the other conical portion thereby rendering the springs on opposite sides of the bolster alternatively operative.

4. In combination, a truck having a frame provided with transversely extending longitudinally spaced guiding surfaces, a laterally movable bolster disposed between and guided by said surfaces and having a center pin bearing, a plurality of springs interposed between one side of said bolster and the frame, a plurality of springs interposed between the opposite side of said bolster and said frame, the springs on the respective sides of the bolster being disposed on each side of the center of the bolster bearing thereby supplementing the action of said guiding surfaces in resisting any rotative effect of the bolster relative to the truck frame during turning of the truck on the center pin, a lifting type centering mechanism operative to provide a maximum centering action when the bolster is near its center position during which time said springs have a minimum centering function, and means whereby said lifting mechanism is substantially ineffective in providing a centering action when the bolster has a predetermined lateral movement during which time said springs have their maximum centering action.

JAMES C. MARIS.